_United States Patent_ [19]

Nurick

[11] Patent Number: 5,649,678
[45] Date of Patent: Jul. 22, 1997

[54] OPERATION OF A HELICOPTER

[75] Inventor: Alan Nurick, Johannesburg, South Africa

[73] Assignee: Denel (Proprietary) Limited, Pretoria, South Africa

[21] Appl. No.: 423,539

[22] Filed: Apr. 17, 1995

[30] Foreign Application Priority Data

Apr. 20, 1994 [ZA] South Africa ............... 94/2707

[51] Int. Cl.$^6$ .................................................. B64C 27/00
[52] U.S. Cl. ................ 244/17.19; 244/207; 244/53 R
[58] Field of Search ............................ 244/207, 17.19, 244/130, 53 R, 65, 23 B

[56] References Cited

U.S. PATENT DOCUMENTS

| | | | |
|---|---|---|---|
| 2,518,697 | 8/1950 | Lee | 244/17.19 |
| 2,918,232 | 12/1959 | Lippisch | 244/23 B |
| 2,932,468 | 4/1960 | Kappus | 244/23 B |
| 3,990,811 | 11/1976 | Danielson | 416/20 R |
| 4,200,252 | 4/1980 | Logan et al. | 244/17.19 |
| 4,828,203 | 5/1989 | Clifton et al. | 244/23 B |
| 4,928,907 | 5/1990 | Zuck | 244/6 |
| 4,948,068 | 8/1990 | Vanttorn | 244/17.19 |
| 5,067,668 | 11/1991 | Zuck | 244/7 R |
| 5,205,512 | 4/1993 | Rumberger | 244/52 |
| 5,232,183 | 8/1993 | Rumberger | 244/52 |
| 5,240,205 | 8/1993 | Allongue | 244/17.19 |

*Primary Examiner*—Andres Kashnikow
*Assistant Examiner*—Tien Dinh
*Attorney, Agent, or Firm*—Ladas & Parry

[57] ABSTRACT

In a helicopter having a main rotor, a tail boom and a circulation control slot along one side of the tail boom, and a thruster which is selectively directable at either side or both sides of the rear end of the tail boom, anti-torque and yaw control are effected by generating separate air flow streams of different pressures by means of separate pressure means and conducting said separate air flow streams at said different pressures in separate passages to respectively the circulation control slot and to the thruster.

8 Claims, 1 Drawing Sheet

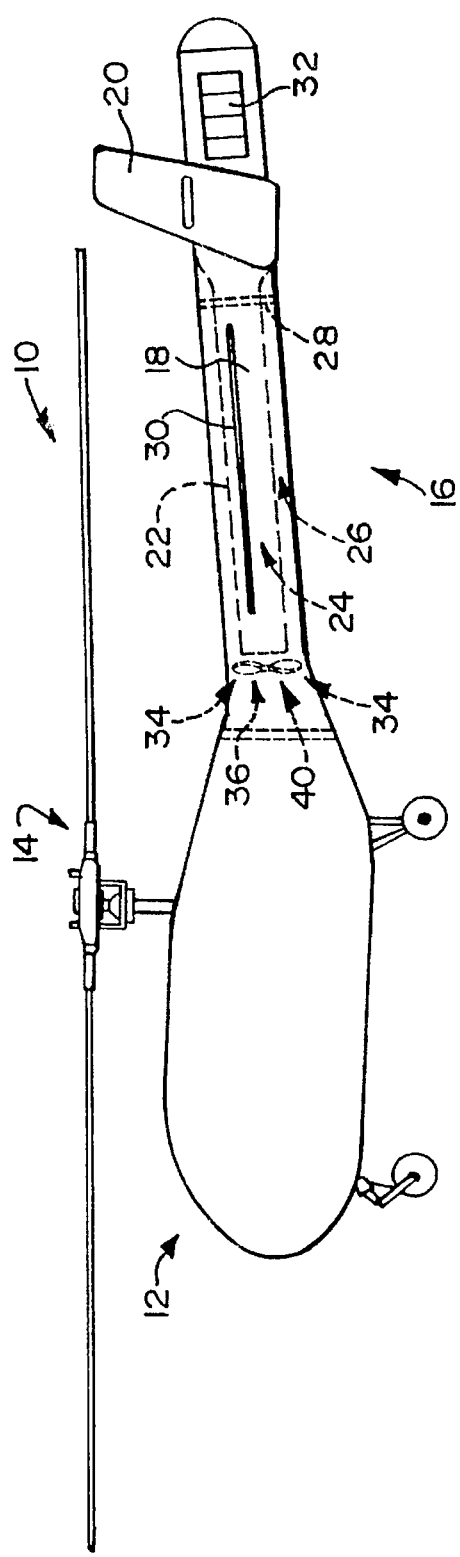
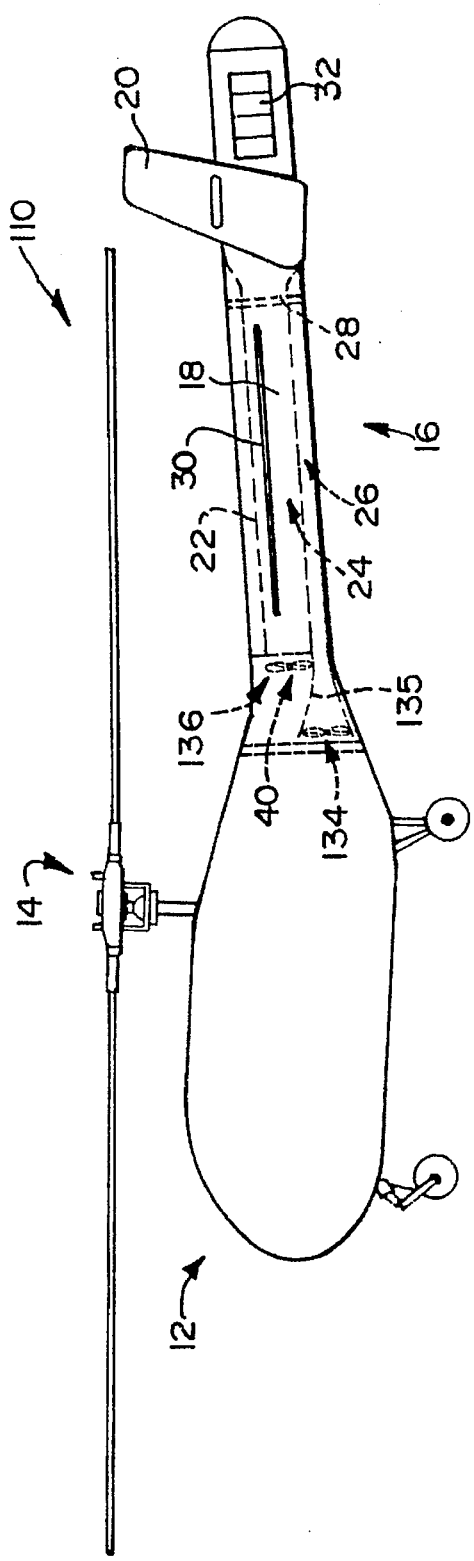

5,649,678

OPERATION OF A HELICOPTER

This invention relates to operation of a helicopter. It relates more specifically to a method of counteracting torque transmitted to a main helicopter rotor and to controlling yaw of the helicopter. It further relates to anti-torque and yaw control apparatus for a helicopter.

It is known, for example from U.S. Pat. No. 4,948,068 to counteract drive torque transmitted to a main helicopter rotor and to control yaw by controlling circulation of airflow around a tail boom and by controlling air expelled laterally through a thruster from a side or sides of a rear end of the tail boom of the helicopter.

The Applicant believes that systems generally corresponding to the system of U.S. Pat. No. 4,948,068 are power hungry and require more power to operate than a comparable, conventional tail rotor.

In accordance with a first aspect of this invention, there is provided a method of operating a helicopter which includes a main rotor, a tail boom having opposed sides and a rear end, a longitudinal circulation control slot along a predetermined one side of the tail boom, and a thruster which is selectively directable at either side or both sides of the rear end of the tail boom, the method including generating, by means of a first pressure means, a first flow stream of air;

conducting the first flow stream via a first passage along the tail boom to the circulation control slot;

generating, by means of a second pressure means, a second flow stream of air;

conducting the second flow stream via a second passage along the tail boom to the thruster, the first and second air flow streams being at different pressures.

Advantageously, the second passage may be a central passage along a centre of the tail boom, and the first passage may be an annular passage surrounding the second passage. Preferably the first and second passages may be concentric at least along upstream portions of their lengths.

In one method, the first and second pressure means may be separate fans. The method may then include individually and separately controlling the separate fans.

In another method, the first and the second pressure means may respectively be an annular portion along a periphery of a fan, and a central portion inward of the annular portion of the fan.

Advantageously, the pressure of the second flow stream which serves the thruster may be lower than the pressure of the first flow stream which serves the circulation control slot.

In accordance with another aspect of this invention, there is provided anti-torque and yaw control apparatus for a helicopter, which has a main rotor, a longitudinal tail boom having opposed sides and a rear, a circulation control slot along a predetermined one side of the tail boom, and a thruster toward the rear of the tail boom and which is directable at either side or both sides of the tail boom, said apparatus comprising a first passage along said tail boom leading to said circulation control slot;

a first pressure means arranged in use to generate a first flow stream of air to flow along said first passage at a predetermined pressure;

a second passage along said tail boom leading to said thruster; and a second pressure means arranged in use to generate a second flow stream of air to flow along said second passage at a pressure different to said predetermined pressure of the first flow stream.

Advantageously, the second passage may be a central passage along a centre of the tail boom, and the first passage may be an annular passage surrounding the first passage. Preferably, the first and second passages may be concentric at least along upstream portions of their lengths.

In one embodiment, the first and second pressure means may be in the form of separate fans. Then, said separate fans may be individually controllable.

In another embodiment, said first and second pressure means may respectively be an annular portion along a periphery of a fan, and a central portion inward of said annular portion of said fan.

The first and second pressure means may be adapted for operation such that the pressure of the second flow stream is lower than the pressure of the first flow stream.

The invention is now described by way of examples with reference to the accompanying diagrammatic drawings. In the drawings FIG. 1 shows, in side view, schematically, a helicopter incorporating a first embodiment of anti-torque and yaw control apparatus in accordance with the invention;

FIG. 2 shows, in side view, schematically, a helicopter similar to the helicopter of FIG. 1 and incorporating a second embodiment of anti-torque and yaw control means in accordance with the invention.

With reference to FIG. 1, a helicopter incorporating anti-torque and yaw control apparatus in accordance with the invention is generally indicated by reference number 10. The helicopter 10 includes a cockpit and passenger or payload enclosure generally indicated by reference number 12, a main rotor 14 above the enclosure 12 and a tail boom 16 extending outwardly from the enclosure 12. The tail boom 16 has opposed sides 18 and one or more tail fins 20 toward a rear of the tail boom 16. Said one tail fin, or one or more of the tail fins if a plurality of the tail fins is provided, may be controllable to control the helicopter when flying at speed.

In accordance with the invention, the helicopter 10 comprises anti-torque and yaw control apparatus including an inner cylinder 22 extending along and within an upstream portion of the tail boom 16 to define a central longitudinal passage 24 within the cylinder 22 and an annular outer passage 26 around the inner cylinder 22. The annular outer passage 26 is a first passage in accordance with the invention and the central passage 24 is a second passage in accordance with the invention. The first passage 26 is terminated at a position immediately in front of the tail fins 20 by means of an annular end plate 28. In another embodiment, a flow restrictor may be provided in place of the end plate 28 merely to restrict throughflow of air and thus not absolutely to seal off the end of the passage. The inner cylinder 22, downstream of the end plate 28, blends into the outer skin or fuselage forming the tail boom 16. Thus, the second passage 24 extends beyond the end of the first passage 26 toward the rear of the tail boom 16. The tail boom 16 is preferably of round cylindrical shape.

The anti-torque and yaw control apparatus further comprises a longitudinal circulation control slot 30 along an upstream portion of the tail boom 16 and terminating generally immediately in front of the end plate 28. The circulation control slot 30 is in communication with the first passage 26.

The anti-torque and yaw control apparatus yet further comprises a thruster located in the rear end portion of the tail boom 16 and having outlets toward either side of the tail boom 16. A thruster outlet 32 on the one side 18 is shown in the drawing. The thruster outlet at the other side is substantially a mirror image of the outlet 32. The thruster can be directed selectively at either of the outlets or both of the outlets.

The anti-torque and yaw control apparatus yet further comprises, in the embodiment of FIG. 1, a single fan 40 toward the upstream end of the tail boom, immediately in front of the position where the inner cylinder 22 commences. The fan 40 comprises an outer peripheral portion 34 aligned with the annular first passage 26, and also an inner portion 36 inward of the annular outer portion 34 which inner portion 36 is aligned with the second passage 24. The fan 40 has one or more inlets allowing it to draw air from atmosphere in use.

In use, the fan 40 generates a first airflow stream by means of its annular outer portion 34 which first airflow stream is directed along the first annular passage 26. The fan 40 further generates a second airflow stream by means of its inner portion 36 which second airflow stream is directed along the central second passage 24.

The design of the fan 40, and more specifically the annular outer portion 34 and the inner portion 36, is such that the pressure of the first air flow stream is in use higher than the pressure of the second airflow stream. Furthermore, the nominal relative volume flows may be predetermined appropriately in accordance with design criteria for the circulation control facility and the thruster facility. Generally, the volume flow of the first flow stream will be less than the volume flow of the second flow stream. It is to be appreciated that the configuration of the fan 40 facilitates meeting these design criteria as the peripheral speed of the annular outer portion 34 will be substantially higher than the peripheral speeds of the inner portion 36. Furthermore, it is to be appreciated that the profile of the fan blades can be different to a substantial degree respectively in the outer annular portion and in the inner portion. Furthermore, it is to be appreciated that the flow characteristics can selectively be varied, e.g. by varying the fan speed, pitch of the blades, resistance of the flow passages, and the like.

Thus, in use, the circulation control slot 30 is supplied with a required amount of air, which is relatively small, and at a required pressure, which is relatively high compared to respectively the volume flow and the pressure required by the thruster. In this fashion, provision of air for the circulation control slot 30 can be optimised. Conversely, flowing from the above, the air supplied to the thruster will generally be of relatively high volume and at a relatively low pressure in accordance with design requirements of the thruster which can, in this invention, be optimised separately.

With reference to FIG. 2, a helicopter similar to the helicopter 10 of FIG. 1 is generally indicated by reference numeral 110. The helicopter 110 has generally similar components and features to the helicopter 10 and the same reference numerals are used to denote the features and components. Thus, those similar features and components are not again described and emphasis is merely placed on a single important difference.

The anti-torque and yaw control apparatus of the helicopter 110 of FIG. 2 has separate fans instead of the single fan 40 of the helicopter 10 of FIG. 1. The separate fans includes a fan 134 directed via a duct 135 at the annular outer passage 26 to supply the circulation control slot 30, and an inner fan 136 aligned with the central passage 24 and supplying the thruster.

Although the design and construction of the separate fans 134 and 136 compared to the single fan 40 having the two portions 34 and 36 as described above, are more complex in as much as two components are provided, it allows the opportunity of driving the fans 134 and 136 by means of separate drive means which can be controlled separately. Thus, the characteristics, e.g. in respect of pressure and volume flow, of the first and second air flow streams can be controlled separately. This allows more versatility in use.

Both of the embodiments have the advantage that the air flow demands or requirements of the circulation control slot on the one hand, and the thruster on the other hand, especially in respect of pressure, can be met in an optimised manner or at least in a closer to optimum manner than what is known in prior art apparatuses. In this regard, the applicant regards it as significant that the inventor appreciated that the requirement in respect of pressure by the thruster is very different to the requirement of the circulation control slot, i.e. the thruster requires substantially lower pressure than the circulation control slot. However, in prior art apparatuses, the higher pressure requirement had to be met in respect of the whole of the air flow thus resulting in air supplied to the thruster being supplied at substantially higher pressure than what is required thus causing energy inefficiency.

The invention thus provides a method and an apparatus which are more energy efficient than known prior art methods and apparatuses. More specifically, the applicant expects the method and the apparatus of this invention to allow a helicopter to be provided and to be operated in respect of anti-torque and yaw control of a general kind described in as energy efficient a manner as is available with conventional tail rotors. Thus, a helicopter in accordance with this invention will have the advantages of the anti-torque and yaw control system of the general kind described and which are well known in the art, without the penalty of being energy hungry.

I claim:

1. A method of operating a helicopter to effect anti-torque and yaw control which helicopter includes a main rotor, a tail boom having opposed sides and a rear end, a longitudinal circulation control slot along a predetermined one side of the tail boom, and a thruster which is selectively directable at either side or both sides of the rear end of the tail boom, the method including generating, by means of a first pressure means, a first flow stream of air at a first relatively higher pressure, conducting the first flow stream via a first passage along the tail boom to the circulation control slot and guiding the first flow stream to exit via the circulation control slot laterally toward said predetermined one side of the tail boom to effect an anti-torque and yaw control reaction force on the tail boom;

generating, by means of a second pressure means, a second flow stream of air at a second pressure relatively lower than said first pressure, conducting the second flow stream via a second passage along the tail boom to the thruster and selectively guiding the second flow stream of air in controlled manner to exit via the thruster to either side or both sides of the tail boom, thus completing, in co-operation with said anti-torque and yaw control reaction force, anti-torque and yaw control of the helicopter.

2. A method as claimed in claim 1 in which the circulation control slot is at a longitudinal position forward of the thruster, in which the second passage is a central passage along a centre of the tail boom and the first passage is an annular passage surrounding the second passage and terminating substantially at a rear end of the circulation control slot, the method including diffusing the second flow stream by increasing a flow area of the second passage beyond said longitudinal position of the circulation control slot.

3. A method as claimed in claim 2 in which the first and second passages are concentric at least along upstream portions thereof, in which the first pressure means is an outer annular portion along a periphery of a fan which is annularly aligned with the first passage, and in which the second pressure means is a central portion of said fan radially inward of said outer annular portion, in which generating the first flow stream of air is by means of tip portions of vanes of the fan at relatively higher speeds and in which generating the second flow stream of air is by means of hub portions of the vanes of the fan at relatively lower speeds.

4. A method as claimed in claim 1 in which the first and second pressure means are separate fans, the method including individually and separately controlling the separate fans respectively to control the volume and pressure of the first flow stream of air and the volume and pressure of the second flow stream of air.

5. Anti-torque and yaw control apparatus for a helicopter, which has a main rotor, a longitudinal tail boom having opposed sides and a rear end, a circulation control slot along a predetermined one side of the tail boom and directed laterally outwardly toward said predetermined one side, and a thruster toward the rear of the tail boom and which is directable at either side or both sides of the tail boom, said apparatus comprising a first passage along said tail boom leading to said circulation control slot;

a first pressure means arranged in use to generate a first flow stream of air to flow along said first passage at a predetermined relatively higher pressure and to exit said circulation control slot laterally in said predetermined one direction to effect an anti-torque and yaw control reaction force on the tail boom;

a second passage along said tail boom leading to said thruster; and a second pressure means arranged in use to generate a second flow stream of air to flow along said second passage at a pressure relatively lower than said predetermined pressure of the first flow stream and to exit in controlled manner to either side or both sides of the tail boom via the thruster, thus to complete, in co-operation with said anti-torque and yaw control reaction force, anti-torque and yaw control of the helicopter.

6. Anti-torque and yaw control apparatus for a helicopter as claimed in claim 5 in which the second passage is a central passage along a centre of the tail boom, in which the first passage is an annular passage surrounding the first passage, in which the circulation control slot is at a longitudinal position forward of the thruster, in which the first passage terminates at said longitudinal position of the circulation control slot and in which said central passage diverges to form a diffuser in the region rearward of said longitudinal position of the circulation control slot.

7. Anti-torque and yaw control apparatus for a helicopter as claimed in claim 6 in which the first and second passages are concentric at least along upstream portions thereof, the apparatus including a fan arranged concentrically of the first and second passages toward upstream ends thereof, an outer annular portion along a periphery of the fan being annularly aligned with the first passage and providing the first pressure means, a hub portion of said fan radially inward of said outer annular portion being aligned with the second passage and providing the second pressure means.

8. Anti-torque and yaw control apparatus for a helicopter as claimed in claim 5 in which the first and second pressure means are provided by separate fans provided for this purpose and which includes control means for individually and separately controlling the separate fans in respect of volume and pressure of the first flow stream of air and in respect of volume and pressure of the second flow stream of air.

* * * * *